United States Patent
Hakla (10) Patent No.: US 12,330,787 B2
(45) Date of Patent: Jun. 17, 2025

(54) RETROFIT WIRELESS CONTROLLER FOR AIRCRAFT PASSENGER SEATS

(71) Applicant: B/E Aerospace, Inc., Winston-Salem, NC (US)

(72) Inventor: Haytham Hakla, Montreal (CA)

(73) Assignee: B/E Aerospace, Inc., Winston-Salem, NC (US)

( * ) Notice: Subject to any disclaimer, the term of this patent is extended or adjusted under 35 U.S.C. 154(b) by 440 days.

(21) Appl. No.: 17/964,693

(22) Filed: Oct. 12, 2022

(65) Prior Publication Data

US 2024/0124140 A1 Apr. 18, 2024

(51) Int. Cl.
*B64D 11/00* (2006.01)
*G06F 3/04847* (2022.01)
*G08C 17/02* (2006.01)

(52) U.S. Cl.
CPC .... *B64D 11/00155* (2014.12); *G06F 3/04847* (2013.01); *G08C 17/02* (2013.01); *B64D 2011/0053* (2013.01)

(58) Field of Classification Search
CPC ...... B64D 11/00155; B64D 2011/0053; B64D 11/0015; B64D 11/0639; G06F 3/04847; G08C 17/02; G08C 2201/93; B60N 2230/20; B60N 2/0228; B60N 2/0237
USPC ........................................................ 455/95.1
See application file for complete search history.

(56) References Cited

U.S. PATENT DOCUMENTS

| | | | |
|---|---|---|---|
| 4,509,097 A * | 4/1985 | Robinson | B64D 11/0624 361/740 |
| 5,835,127 A * | 11/1998 | Booth | B64D 11/0015 725/77 |
| 8,957,791 B2 | 2/2015 | Macrae et al. | |
| 9,694,725 B2 | 7/2017 | Watson et al. | |
| 10,464,675 B1 * | 11/2019 | Rabii | G08C 17/02 |
| 11,008,104 B2 | 5/2021 | Streckert et al. | |
| 11,176,810 B2 | 11/2021 | Kimsey-Lin | |
| 11,387,902 B2 | 7/2022 | Kimsey-Lin | |
| 2010/0224727 A1 | 9/2010 | Bauer et al. | |
| 2015/0017915 A1 | 1/2015 | Hennequin et al. | |
| 2017/0283068 A1 | 10/2017 | Udriste et al. | |
| 2018/0097685 A1 * | 4/2018 | Jouper | H04L 12/40169 |
| 2020/0262580 A1 * | 8/2020 | Palaniappan | B64D 25/14 |
| 2020/0339266 A1 | 10/2020 | McMillan | |

* cited by examiner

*Primary Examiner* — Don N Vo
(74) *Attorney, Agent, or Firm* — Suiter Swantz IP (57) ABSTRACT

A system and method for remote control of a passenger control unit (PCU) via a mobile communications device includes a wireless controller and receiver installed between the PCU and a PCU control module connected to actuators for seats and other peripheral devices. The wireless controller includes a set of contacts mapped to a matrix of switches within the PCU. The wireless receiver receives a contact signal from a user device configured for execution of a graphical interface of virtual contacts mapped to the set of contacts. When the user engages a virtual contact, the contact signal indicates the engaged virtual contact and the wireless controller engages the corresponding contact. The PCU control module detects the engaged contact as an engagement of the corresponding PCU switch and signals the appropriate seat or peripheral device actuator. Seats and peripheral devices may be simultaneously controlled via the physical PCU or via mobile device.

13 Claims, 9 Drawing Sheets

602 — Connecting a wireless controller between a passenger control unit (PCU) and a PCU control module
- the PCU comprising a plurality of one or more switches, each switch associated with at least one peripheral device,
- the wireless controller including a plurality of contacts, wherein at least one contact is mapped to each switch of the PCU

604 — Providing a set of encoded instructions executable by at least one mobile communications device associated with a user, the encoded instructions configured to cause the mobile device to:
- Establish a wireless link to the wireless controller via at least one wireless protocol
- Recognize at least one of the user or the at least one peripheral device
- Load to the mobile device a graphical user interface (GUI) corresponding to the recognized user or peripheral device, the GUI comprising a plurality of virtual contacts corresponding to the plurality of contacts
- When a virtual contact is engaged by the passenger, transmit a contact signal to the wireless controller via the wireless link, the contact signal indicative of the engaged virtual contact

606 — Engaging, via the wireless controller, the contact corresponding to the engaged virtual contact indicated by the contact signal, the engaged contact detectable by the PCU control module as an engagement of the PCU switch to which the engaged contact is mapped

*FIG. 6*

RETROFIT WIRELESS CONTROLLER FOR AIRCRAFT PASSENGER SEATS

BACKGROUND

Many actuated aircraft passenger seats incorporate some sort of mechanical passenger control unit (PCU; also, passenger service unit (PSU)) to control the position and/or configuration of the passenger seat and/or additional peripheral devices in the vicinity of the passenger seat or which the passenger occupying the passenger seat may utilize while seated. For example, peripheral devices may include reading lights, gaspers/fans/ventilation units, crewmember call buttons, and in-flight entertainment (IFE) devices. As many passengers are likely to carry some sort of smartphone or mobile computing/communications device (e.g., a mobile cellular telephone with some sort of integrated wireless and/or Internet capabilities), it may be desirable to provide a means by which passengers may control these peripheral devices via their mobile device (e.g., without having to change position in order to reach a physical PCU). However, legacy system hardware and software architectures may predate widespread smartphone use and as such may not be configured for mobile device-based actuation without substantial reconfiguration on a seat-by-seat or suite-by-suite basis. Further, any such reconfiguration may not only be extensive and/or cumbersome but may require recertification of any new components.

SUMMARY

In a first aspect, a system for simultaneous control of a set of aircraft peripheral devices (e.g., seat configuration, lighting, crew call buttons) via a passenger control unit (PCU) and a mobile communications device is disclosed. In embodiments, the system includes a wireless controller and wireless receiver installed between the PCU and the PCU control module (which responds to activations of PCU switches by signaling the appropriate seat or device actuators). The wireless controller includes a set of contacts mapped to the matrix of PCU switches, and the wireless receiver links to a user device (e.g., a smartphone or other like mobile communications device) via encoded instructions allowing the user device to display a graphical user interface (GUI) including a set of virtual contacts identical to the wireless controller contacts. For example, when the user engages with (presses, interacts with, actuates) a virtual contact, the mobile device sends a contact signal to the wireless controller, which activates the contact corresponding to the engaged virtual contact. As the set of contacts is mapped to the PCU switch matrix, the PCU control module detects the activation of the contact by the wireless controller as an engagement of the PCU switch to which the engaged contact is mapped. Accordingly, the PCU control module signals the appropriate seat or device actuator as though the PCU switch had been physically engaged.

In some embodiments, the wireless controller and wireless receiver share a common printed circuit board (PCB).

In some embodiments, an in-flight entertainment (IFE) device or system wirelessly receives the contact signal and sends its own auxiliary signal indicative of the engaged virtual contact to the wireless controller (e.g., via wireless link or physical bus). The wireless controller decodes the auxiliary signal received from the IFE device to determine which virtual contact was engaged and engages the corresponding contact.

In some embodiments, the peripheral devices controllable via the mobile device include: aircraft passenger seats; cabin crew call buttons; reading or cabin lights; IFE devices and systems; and climate control devices (e.g., fans, gaspers).

In some embodiments, the mobile device recognizes and verifies the user (e.g., as authorized for remote control of the peripheral devices) via one or more of: a data string identifying the user or the mobile device (e.g., as the user to whom a seat has been assigned); flight information (e.g., a flight number or seat assignment); or encoded information (e.g., QR code assigned to the user at check-in).

In some embodiments, the wireless controller receives operating power via physical connection to an aircraft power supply.

In some embodiments, the wireless controller includes dip switches configured to identify the wireless controller (and, for example, the passenger seat or set of peripheral devices with which is associated) among a set of wireless controllers (e.g., each wireless controller assigned to a seat in a passenger cabin). For example, the dip switches are programmed to identify each wireless controller with a unique name detectable by the mobile device, so the mobile device may find the right wireless controller for a user or passenger's assigned seat.

In a further aspect, a method for simultaneous control of a passenger seat and/or set of peripheral devices via a passenger control unit (PCU) and a mobile communications device carried by a passenger assigned to the seat is also disclosed. In embodiments, the method includes connecting a wireless controller between the PCU and a PCU control module, where the PCU includes a matrix of switches and the PCU control module signals the appropriate seat or device actuator when a PCU switch is engaged. The wireless controller includes a set of contacts mapped to the PCU switch matrix. The method includes providing a user with encoded instructions downloadable to and executable by the mobile device; for example, the instructions allow the mobile device to establish a wireless link to the wireless controller, recognize the user as an authorized user of the PCU, and provide the user (e.g., via an interactive touchscreen) with a graphical user interface (GUI) including a set of virtual contacts mapped to the set of contacts in the wireless controller. The method includes, when the user engages a virtual contact via the GUI, sending a contact signal via the mobile device indicative of which virtual contact was engaged. The method includes receiving the contact signal via the wireless controller. The method includes engaging, via the wireless controller, the contact corresponding to the engaged virtual contact. As the wireless controller has mapped the set of contacts to the matrix of PCU switches, the PCU control module detects the engagement of a contact as an actuation of the physical PCU switch to which the contact is mapped, signaling the appropriate seat or device actuator as though the physical switch was engaged.

In some embodiments, the method includes authorizing or verifying the user (e.g., as an authorized user of the PCU) based on a user data string identifying the user or device, flight information (e.g., a flight number or seat to which the user has been assigned), or other encoded information (e.g., a QR code assigned to the user at check-in).

In some embodiments, the method includes wirelessly receiving the contact signal via an in-flight entertainment device, which sends its own auxiliary signal to the wireless controller. The method further includes decoding the auxiliary signal received from the IFE device to determine the virtual contact engaged by the user. The method includes engaging the corresponding wireless controller contact corresponding to the engaged virtual contact.

In some embodiments, the peripheral devices controllable via the mobile device include: aircraft passenger seats; cabin crew call buttons; reading or cabin lights; and climate control devices (e.g., fans, gaspers).

In some embodiments, the method includes identifying, via the mobile device, the wireless controller (e.g., among a set of otherwise identical wireless controllers) based on a distinct controller identifier assigned to the wireless controller.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to methods and systems for minimally invasive retrofitting of legacy seating and passenger cabin architectures for remote control by a passenger via their mobile device (personal electronic device (PED), e.g., smartphone or other like mobile communications/computing device). For example, by installing a wireless controller in the control chain between the PCU and its control module, the mechanical switch matrix in the PCU may be duplicated without interfering with the manual operation of the PCU or otherwise disrupting the control chain. Control input may be provided either manually or via the mobile device. Information sharing between the mobile device and wireless controller is minimal, so the wireless controller is an easily certifiable retrofit for legacy systems.

Figure 1:
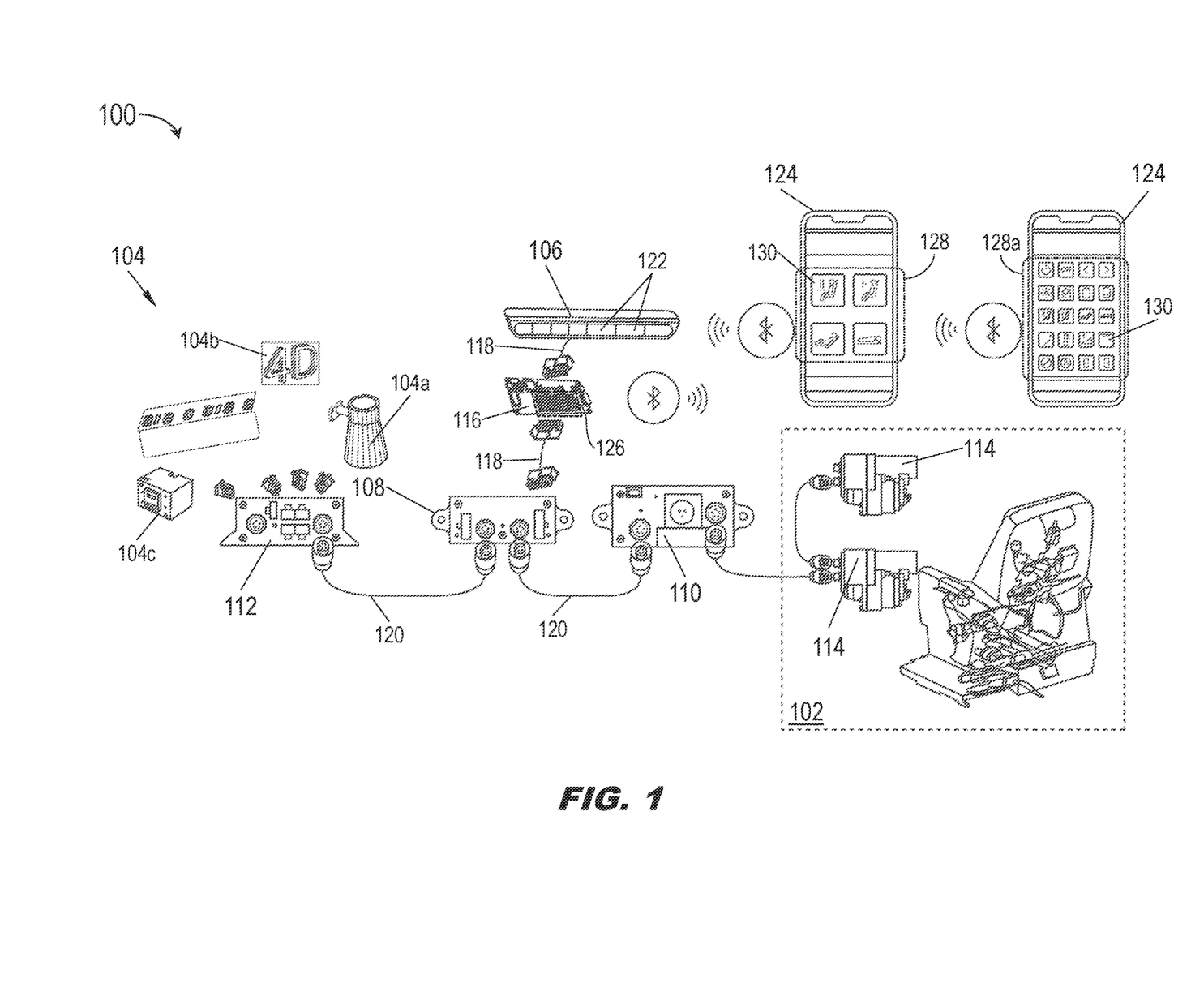
FIG. 1 is a diagrammatic illustration of an aircraft cabin environment incorporating a wireless controller connected between a passenger control unit (PCU) and the corresponding PCU control module, according to example embodiments of this disclosure.

Referring now to FIG. 1, an aircraft 100 is shown. The aircraft 100 may include a passenger seat 102, peripheral devices 104, passenger control unit 106 (PCU), PCU control module 108, seat control module 110, peripheral control module 112, seat actuators 114, and wireless controller 116.

In embodiments, the passenger seat 102 may be disposed within a passenger cabin of the aircraft 100 or within a passenger suite of one or more seats partitioned off from the main passenger cabin. For example, a passenger seat 102 occupied by, or assigned to, a particular passenger (e.g., user) may further be associated with one or more peripheral devices 104 for use by the occupying passenger, e.g., reading lights 104a, in-flight entertainment (IFE) systems 104b, USB or other data/power outlets 104c. In embodiments, the control chain for the passenger seat 102 and other peripheral devices 104 may extend from the PCU 106 to the PCU control module 108 (e.g., via physical cable or other like multi-pin bus 118) and from the PCU control module to peripheral control modules 112 and the seat control module 110 (via Level E controller area network (CAN) bus 120), and from the seat control module 110 to individual seat actuators 114 within the passenger seat 102 proper, each seat actuator configured to adjust a particular aspect of the position and/or configuration of the passenger seat, e.g., tracking, reclining, and/or conversion to slouched and berthed configurations where available.

In embodiments, the PCU 106 may comprise a set of physical switches 122 (e.g., switch matrix: buttons, levers, slides), each physical switch associated with the passenger seat 102 (e.g., with one or more seat actuators 114) or with a peripheral device 104. For example, when the passenger occupying the passenger seat 102 wishes to recline the seat, they may engage with the physical switch 122 controlling reclining operations. The PCU 106 may send a switch input signal to the PCU control module 108 indicative of the engagement with a particular physical switch 122. In embodiments, when the PCU control module 108 receives a switch input signal from the PCU 106 indicative of engagement with a particular physical switch 122, the PCU control module 108 may in turn relay the switch input signal to the appropriate peripheral control module/s 112 or seat actuator/s 114 (e.g., via the seat control module 110).

In embodiments, the wireless controller 116 may be installed between the PCU 106 and PCU control module 108, such that the PCU 106 may be physically connected to the wireless controller 116, and the wireless controller physically connected to the PCU control module 108, via multi-pin bus 118. For example, interaction or engagement by the passenger with physical switches 122 of the PCU 106 may trigger switch input signals that travel normally from the PCU through the wireless controller 116 to the PCU module 108 and are processed normally such that the passenger may continue to control the passenger seat 102 and peripheral devices 104 via the PCU 106.

In embodiments, the wireless controller 116 may establish a wireless link to a mobile communications or computing device 124 (e.g., personal electronic device (PED)) carried by the passenger. For example, the passenger may be directed to download and install to the mobile device 124 an executable application allowing the mobile device 124 to identify the configuration of the passenger seat 102, peripheral devices 104, and PCU 106. Similarly, the application may allow the passenger to verify that they (e.g., and only they, excluding passengers in adjacent or nearby seats) are authorized to control the passenger seat 102 and peripheral devices 104 via the mobile device 124. For example, the passenger may, via the mobile device 124, identify themselves as the individual having reserved (or having been assigned) the passenger seat 102 for a particular flight. Alternatively or additionally, the passenger may provide to the mobile device 124 identifying information (e.g., a unique identification number, flight number, and/or seat designation) or encoded information (e.g., a QR code or like encoded data uniquely identifying the passenger to the wireless controller 116).

In embodiments, the wireless controller 116 may include a set of contacts 126, e.g., a matrix of electromechanical relays. For example, the set of contacts 126 may include contacts or relays mapped to each physical switch 122 of the PCU 106. In embodiments, the set of contacts 126 may provide for remote control (e.g., via the wireless controller 116) of any passenger seat 102 and/or peripheral device 104 controllable via the PCU 106 as disclosed below.

In embodiments, the mobile device 124 may establish a wireless link to the wireless controller 116 via, e.g., Bluetooth, ZigBee, near field communications (NFC), or any appropriate like wireless communications protocols. For example, the mobile device 124 may verify the passenger as an authorized user and identify the configuration of the passenger seat 102, peripheral devices 104, and PCU 106 available to the passenger. In embodiments, the application will cause the mobile device 124 to display a graphical user interface 128 (GUI) emulating the set of contacts 126, e.g., the mappings of contacts to physical switches 122 of the PCU 106 by the wireless controller 116. For example, the GUI 128 display may reflect a relatively simple PCU 106 comprising a call button and seat reconfigurations (recline, berth, upright). In some embodiments, the GUI (128a) may reflect a more intricate PCU 106 configured for adjusting seat configuration, reading lights, climate control, and other amenities.

In embodiments, the GUI 128, 128a may provide the passenger with a virtual PCU accessible via the mobile device 124. For example, the GUI 128, 128a may include a set of virtual contacts 130 duplicating the set of contacts 126 mapped to the physical switches 122 of the PCU 106 by the wireless controller 116. For example, when the passenger engages a virtual contact 130 within the GUI 128, 128a, the mobile device 124 may transmit a contact signal via the wireless protocol to the wireless controller 116, the contact signal indicative of which virtual contact was engaged. Accordingly, the wireless controller 116 may engage the appropriate contact 126 or relay corresponding to the engaged virtual contact (e.g., transmit a switch input signal indicative of an engagement of the appropriate physical switch 122 of the PCU 106), which the PCU control module 108 may likewise detect as an engagement of the appropriate physical switch within the PCU switch matrix. In embodiments, the PCU control module 108 may therefore process the engagement of the contact 126 by the wireless controller 116 as equivalent to a physical engagement by the passenger with the appropriate physical switch 122 of the PCU 106, forwarding the appropriate switch input signal to the appropriate seat control module 110 or peripheral control module 112.

Figure 2:
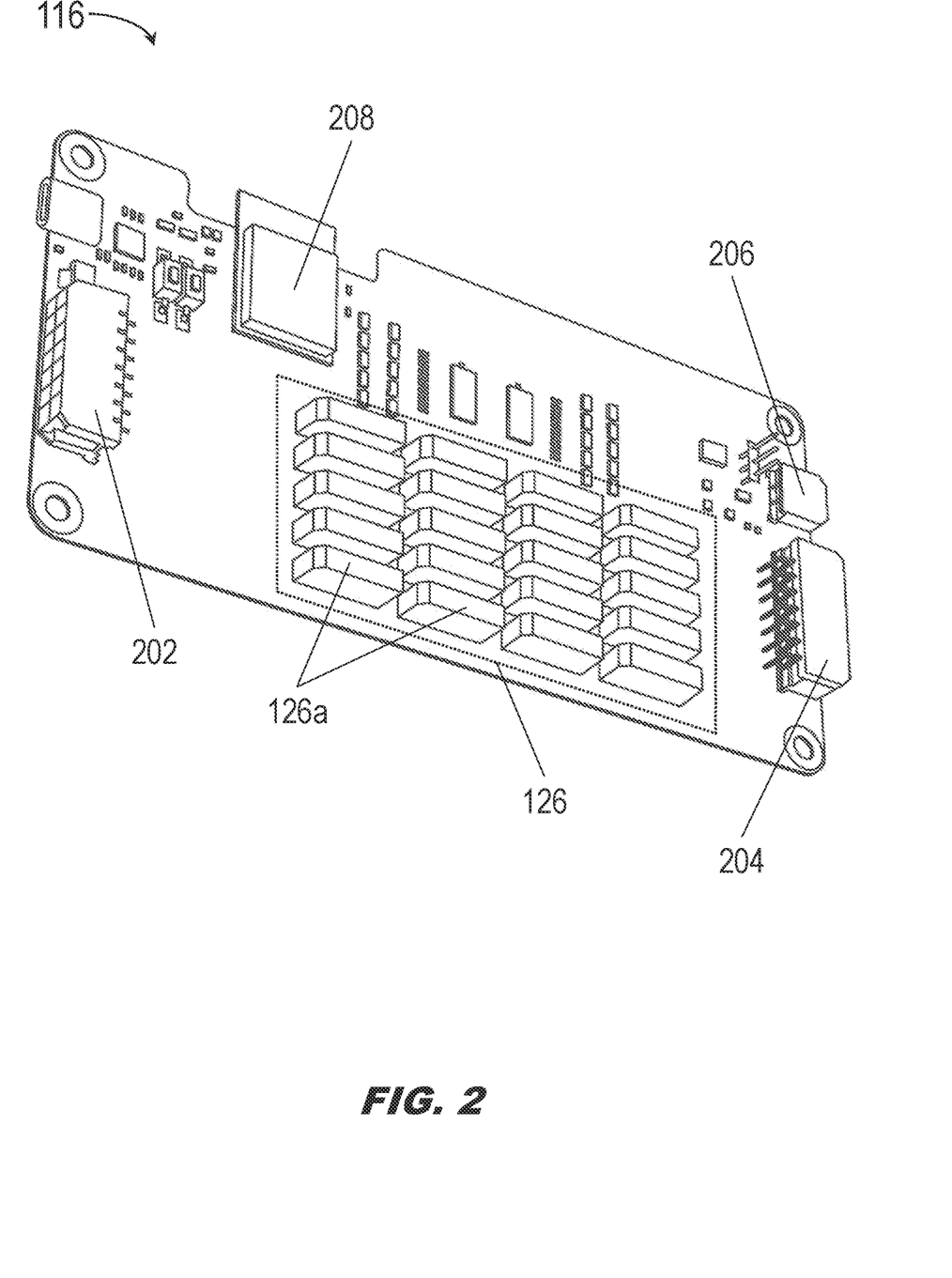
FIG. 2 is an isometric view of the wireless controller of FIG. 1.

Referring now to FIG. 2, the wireless controller 116 is shown.

In embodiments, the wireless controller 116 may include two sets of physical connectors 202, 204 (e.g., 14-pin or any like appropriate multi-pin bus connector and cable combination). For example, the physical connector 202 may connect the wireless controller 116 to the PCU (106, FIG. 1) and the physical connector 204 may connect the wireless controller 116 to the PCU control module (108, FIG. 1), in both cases via physical cable or multi-pin bus (118, FIG. 1). For example, the physical connectors 202, 204 may both be connected in parallel to match the physical connector (not shown) on the PCU control module 108 (e.g., such that the wireless controller 116 is invisible to the PCU control module 108, and any switch input signals from the PCU 106 or the wireless controller 116 are treated and processed by the PCU control module as equivalent).

In embodiments, the wireless controller 116 may include a 5 VDC to 28 VDC power input 206 allowing the wireless controller 116 to draw operating power from any available aircraft power supply; in some embodiments, the wireless controller 116 may include a USB-C connection (not shown) for operating power.

In embodiments, the wireless controller 116 may include a microcontroller 208 configured for establishing a wireless link to the mobile device (124, FIG. 1) and both receiving and processing contact signals from the mobile device 124 when virtual contacts (130, FIG. 1) are engaged by the passenger. In some embodiments, the wireless controller 116 and microcontroller 208 are embodied in a single printed control board (PCB) module as shown by FIG. 1; alternatively or additionally, relay signal reception and processing may be handled by a remote IFE device as shown below.

In embodiments, the wireless controller 116 may include a set of contacts 126, e.g., an electromechanical switch matrix. For example, the set of contacts 126 may comprise a two-dimensional (2D) array incorporating sufficient contacts 126a (e.g., electromechanical relays) to emulate any appropriate configuration of switch matrix implemented by the PCU 106. For example, the set of contacts 126 may be a 5×4 matrix of 20 contacts 126a; in some embodiments, the size of the set of contacts may be scaled up or down as necessary.

Figure 3A:
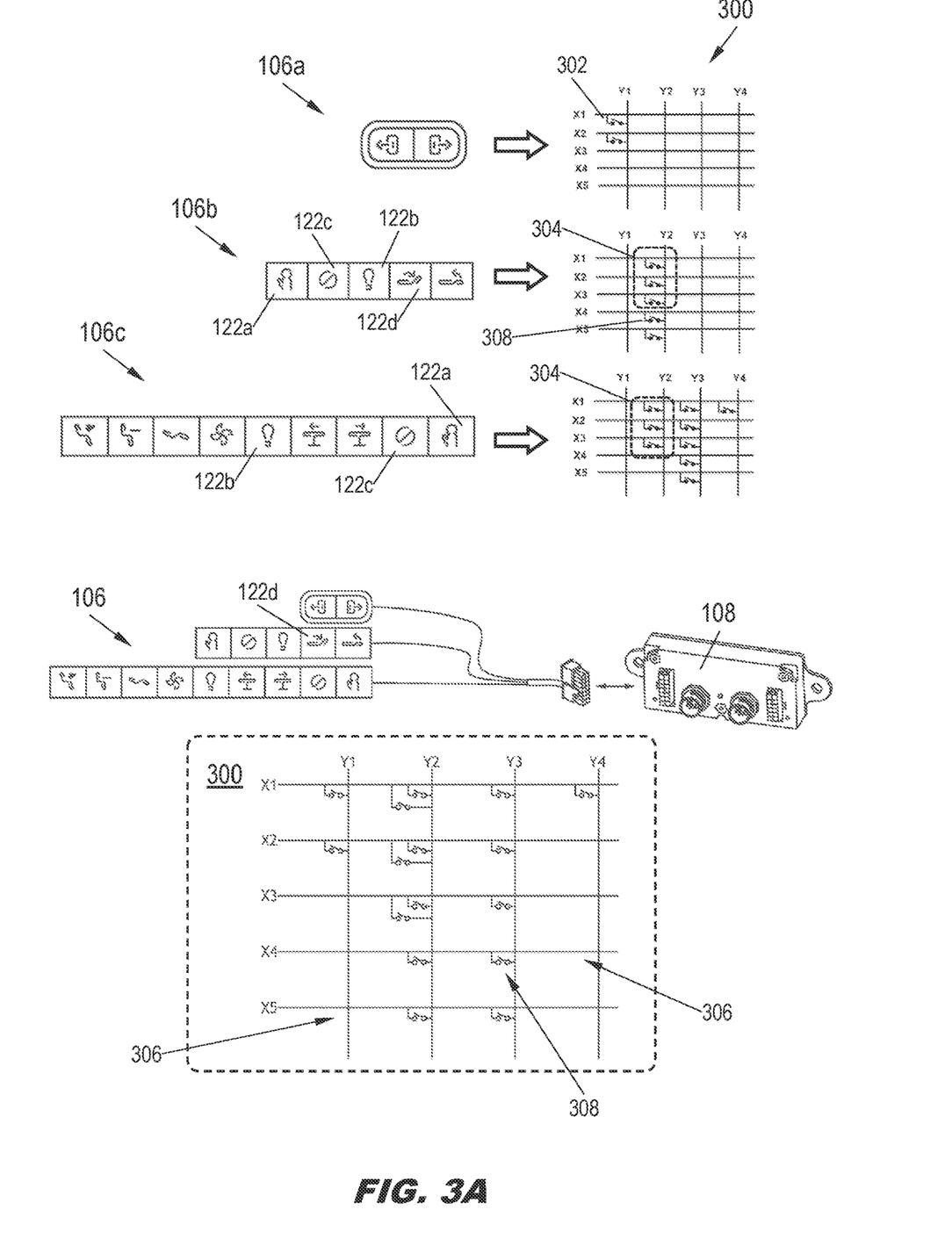
FIG. 3A is a diagrammatic illustration of the PCU, PCU control module, and PCU control module switch matrix of FIG. 1.

Referring now to FIG. 3A, the PCU 106 and PCU control module 108 are shown.

In embodiments, the physical switches 122 (e.g., buttons, keys) of the PCU 106 may be arranged in an XY (e.g., 5×4) matrix format, as reflected by the switch matrix 300 of the PCU 106. For example, each unique physical switch 122 may connect a unique X-column and Y-row relay 302 when engaged: X1-Y1, X2-Y1, etc. In some embodiments, the PCU 106 may comprise multiple PCU components 106a-106c disposed at various locations within a passenger suite, each PCU component 106a-106c mapped to a set of X-column and Y-row relays within the switch matrix 300. For example, some mappings of PCU components 106a-106c may partially overlap, in that some physical switches 122 are common keys (call button 122a, light control 122b, do not disturb 122c (DND)) which are duplicated among the PCU components. Accordingly, each set of common keys 122a-122c connects the same X-column and Y-row relay (304) when engaged: X1-Y2, X2-Y2, X3-Y2 (if either common key is engaged, the same seat actuator (114, FIG. 1) or peripheral device (104, FIG. 1) is adjusted). In some embodiments, some X-column and Y-row relays within the PCU switch matrix 300 may remain unassigned (306), e.g., X4-Y4, X5-Y1.

Figure 3B:
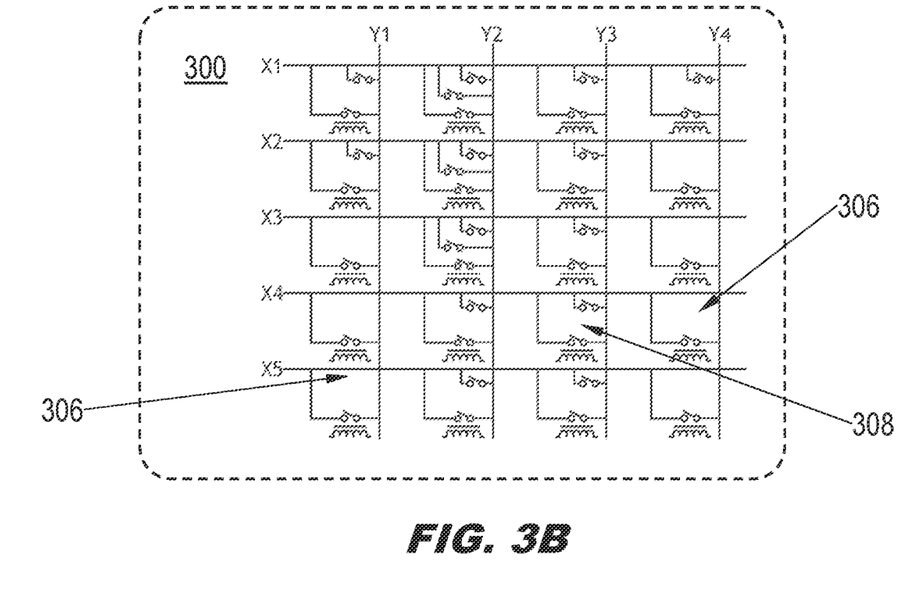
FIG. 3B is a diagrammatic illustration of the PCU, PCU control module, and PCU control module switch matrix of FIG. 3A, incorporating the wireless controller of FIG. 1 according to example embodiments of this disclosure.

Referring also to FIG. 3B, the wireless controller 116 may be connected between the PCU 106 and PCU control module 108. In embodiments, the installation of the wireless controller 116 may map one or more contacts (126a, FIG. 2) of the wireless controller set of contacts (126, FIG. 2) to each X-column Y-row relay 302 of the PCU switch matrix 300. For example, when a particular contact 126a of the set of contacts 126 is engaged by the microcontroller 208, the row-column connection to which the engaged contact is mapped may be closed (e.g., X4-Y3). In embodiments, the PCU control module 108 may detect the closing of the X4-Y3 connection as equivalent to a physical engagement of the X4-Y3 relay 308, i.e., a physical engagement by the passenger with the physical switch 122d of the PCU 106 mapped to the X4-Y3 relay 308 of the PCU switch matrix 300, e.g., a switch input signal to adjust a seat actuator (114, FIG. 1) controlled by the switch 122d (e.g., to transition the passenger seat (102, FIG. 1) to a berthed configuration). Accordingly, the PCU control module 108 may forward the appropriate switch input signal to the seat actuator 114 as though the physical switch 122d had been engaged. Similarly, when the contact 126a is disengaged by the microcontroller 208, the row-column connection at X4-Y3 may be reopened, detectable by the PCU control module 108 as a release of the corresponding physical switch 122d. Accordingly, the passenger may adjust the passenger seat 102 and/or peripheral devices (104, FIG. 1) by directly engaging with physical switches 122 of the PCU 106, or by engaging with the corresponding virtual contacts (130, FIG. 1) via the mobile device 124 and GUI (128/128a FIG. 1), with both physical and virtual engagements similarly and seamlessly processed by the PCU control module 108.

Figure 4A:
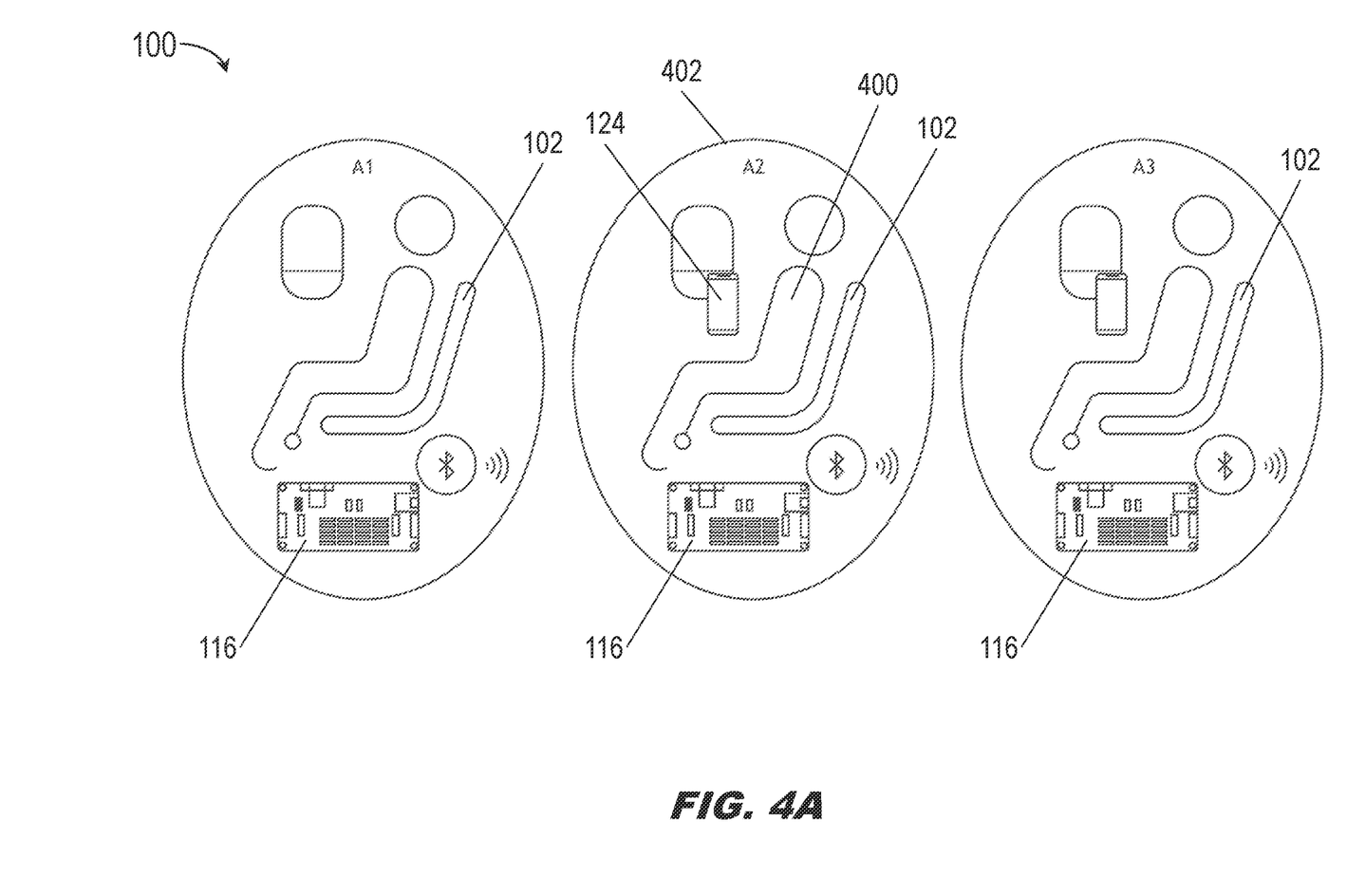
FIG. 4A is a diagrammatic illustration of the aircraft cabin environment incorporating wireless controllers of FIG. 1.

Referring now to FIG. 4A, the aircraft 100 is shown.

In embodiments, multiple passenger seats 102, e.g., within a single row or section of a passenger cabin, may each incorporate a dedicated wireless controller 116 enabling remote control of the passenger seat 102 and any associated peripheral devices (104, FIG. 1) by a passenger 400 via their mobile device 124. For example, by limiting the range of the wireless controller 116, it may be possible to limit access to each wireless controller (and therefore control of any associated passenger seats 102 and peripheral devices) to any mobile device 124 within a proximate range 402 of the wireless controller.

In some embodiments, where it may not be possible or practical to limit the wireless range of the wireless controller 116, wireless control applications downloadable to, and executable by, the mobile device 124 may provide exclusive access to, and control of, a particular wireless controller for an authorized mobile device, e.g., a mobile device associated with the passenger assigned to the corresponding passenger seat 102.

Figure 4B:
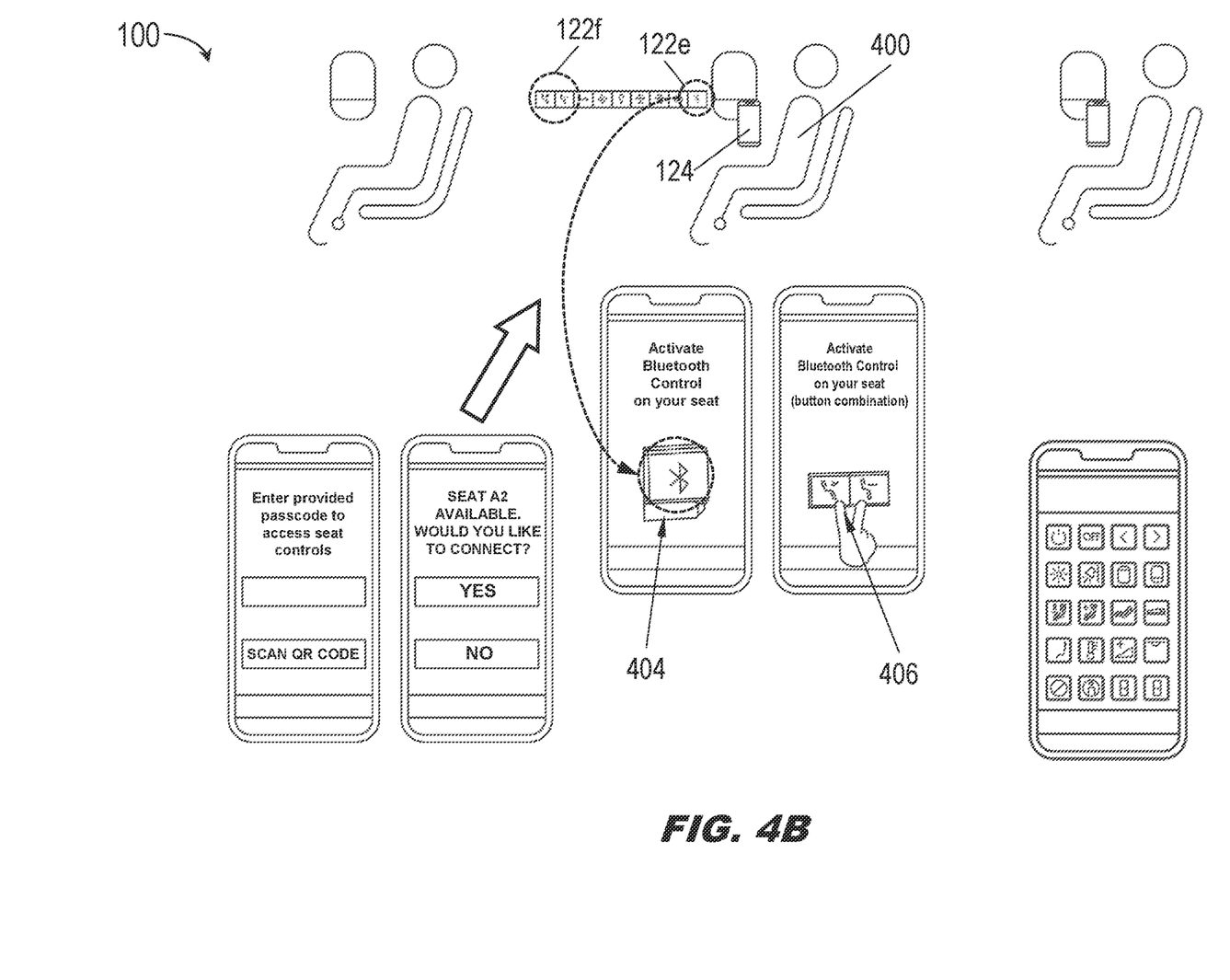
FIG. 4B is a diagrammatic illustration of activation and verification operations of the wireless controllers of FIG. 4A.

Referring also to FIG. 4B, in embodiments the passenger 400 may activate or deactivate the wireless controller 116 by engaging (404) with a dedicated physical switch 122e (or, in some embodiments, engaging (406) with a dedicated combination of physical switches 122f). For example, once the wireless controller 116 is activated, the passenger 400 may attempt to establish a wireless link to the wireless controller via a mobile device 124 (e.g., subject to verification or authorization as noted above). When establishing a wireless link between the mobile device 124 and the wireless controller 116, the passenger 400 may be prompted by their mobile device to verify via the application that they and/or their mobile device are authorized for access to the wireless controller. For example, the mobile device 124 may request the passenger 400 provide unique identifying information, e.g., identification number, flight number, biometric information, seat assignment. In some embodiments, the passenger 400 may receive encoded information at check-in, e.g., a passcode or scannable QR code, and may provide this encoded information to the mobile device 124 to establish a wireless link to the wireless controller 116. In some embodiments the passenger 400 may be identified to the application via facial recognition, fingerprint scan, and/or any other appropriate biometric identification means for which the mobile device 124 may be configured.

Figure 4C:
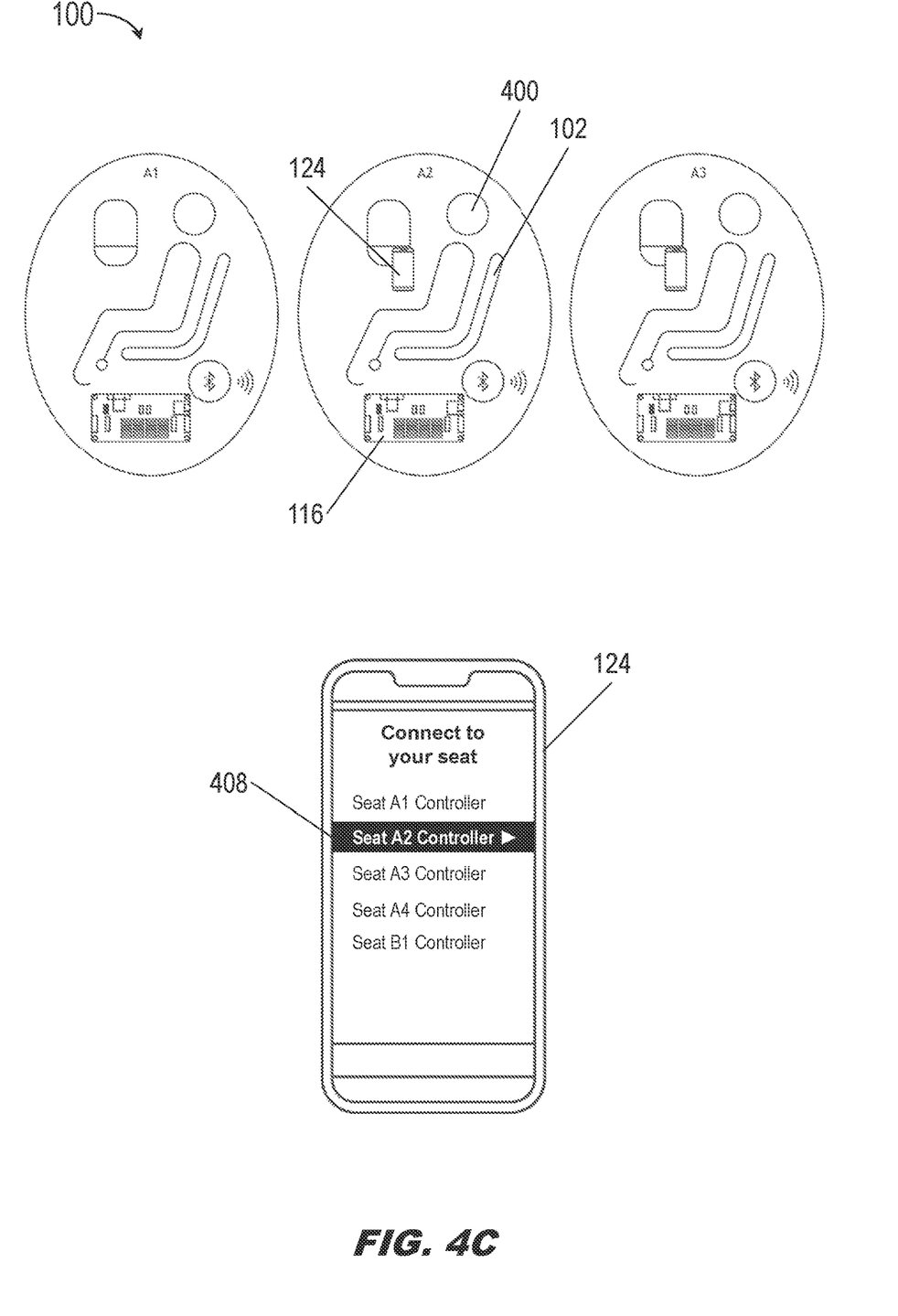
FIG. 4C is a diagrammatic illustration of the cabin environment of FIG. 4A, wherein each wireless controller of FIG. 1 is assigned a unique identifier.

Referring now to FIG. 4C, in some embodiments each wireless controller 116 may be configured with a unique identifier 408. For example, the aircraft 100 may incorporate multiple wireless controllers 116, each wireless controller assigned to a particular passenger seat 102 within the passenger cabin. It may be desirable for each passenger 400 to quickly and easily identify and connect to the wireless controller 116 assigned to their passenger seat 102 without, for example, altering the firmware of each wireless controller so that each wireless controller has a unique part number (and would essentially be a distinct piece of hardware).

In embodiments, each wireless controller 116 may include a set of dip switches (not shown) configurable at installation so that the encoded instructions downloaded by the mobile device 124 sees each wireless controller as associated with a distinct identifier 408. Accordingly, the passenger 400 assigned to seat A2 may easily identify the wireless controller 116 also assigned to seat A2 and connect to the appropriate wireless controller.

Figure 5A:
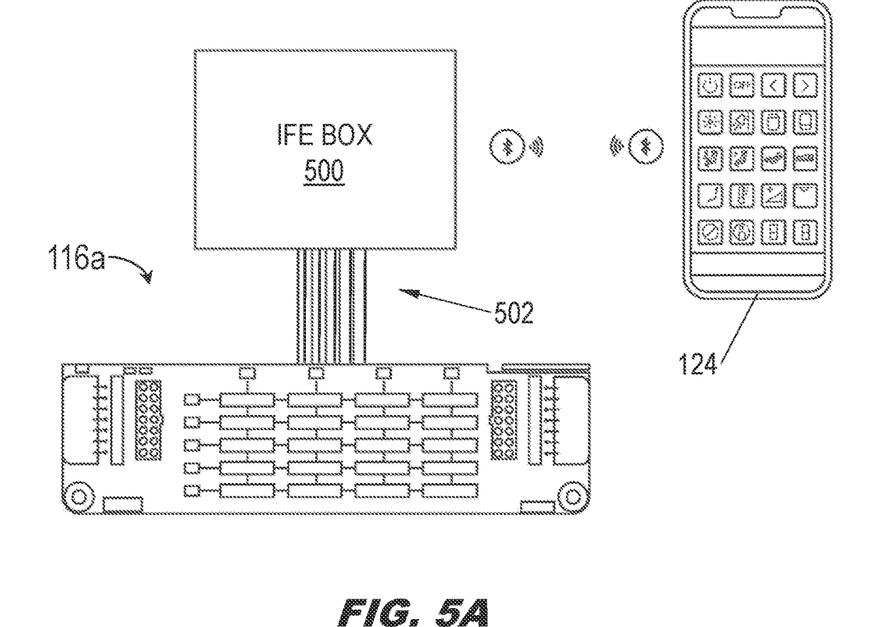
FIGS. 5A and 5B are diagrammatic illustrations of the wireless controller of FIG. 1 incorporating remote wireless receivers within a connected in-flight entertainment (IFE) device in respectively physical or wireless communication with the wireless controller.
Figure 5B:
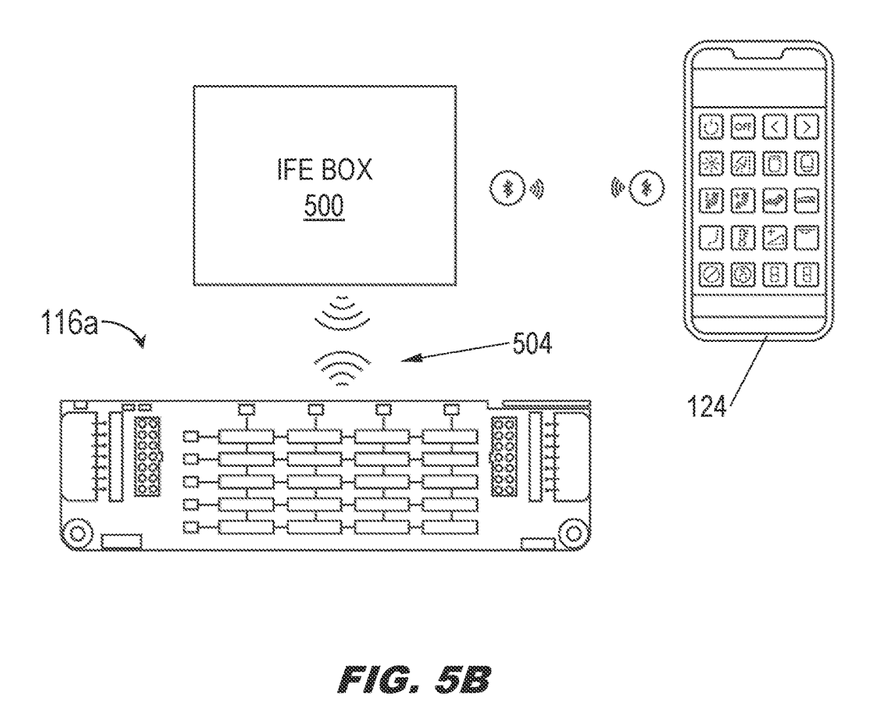

Referring now to FIGS. 5A and 5B, the wireless controller 116*a* may be implemented and may function similarly to the wireless controller 116 of FIGS. 1 through 4A, except that the wireless controller 116*a* may not include an onboard microcontroller (208, FIG. 2). In some embodiments, wireless contact signals transmitted by the mobile device 124 may be received by an in-flight entertainment (IFE) device 500 configured for receiving the contact signals and forwarding its own auxiliary signals to the wireless controller 116*a* based on the received contact signals. For example, the wireless controller 116*a* may incorporate a logic decoder configured to determine, based on a received auxiliary signal received from the IFE device 500, which virtual contact (130, FIG. 1) was engaged via the mobile device and, accordingly, which contact (126*a*, FIG. 2) to engage. In embodiments, the IFE device 500 and wireless controller may be physically connected, e.g., via a 4-bit, 5-bit, or like digital bus 502 as shown by FIG. 5A. In some embodiments, the IFE device 500 and wireless controller 116*a* may establish a wireless link 504 via Bluetooth, ZigBee (IEEE 802.15.4) or other like secure wireless protocol.

Figure 6:
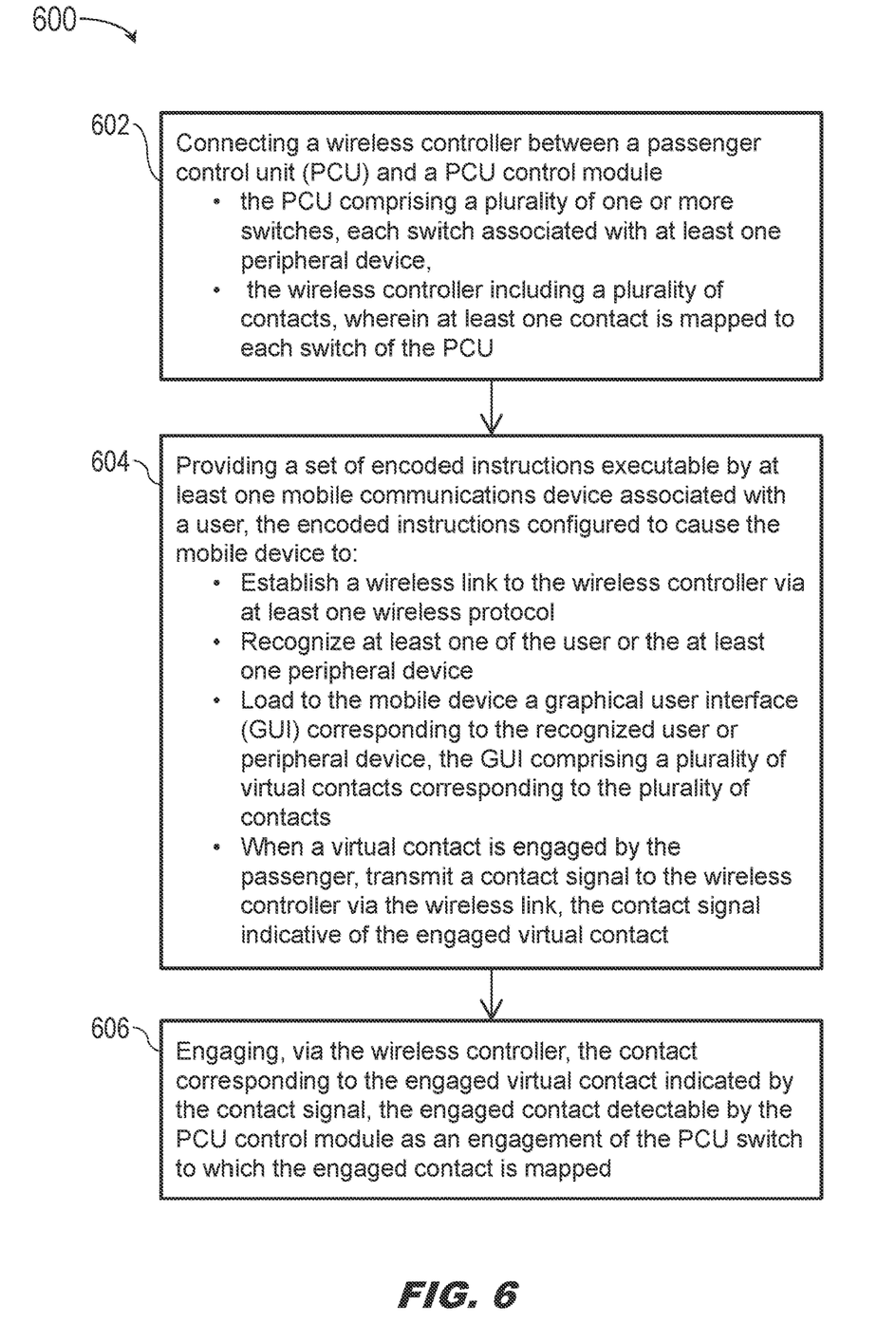
FIG. 6 is a flow diagram illustrating a method for remote wireless control of a passenger control unit (PCU) via a mobile device according to example embodiments of this disclosure.

Referring now to FIG. 6, the method 600 may be implemented by the wireless controller 116 and may include the following steps.

At a step 602, a wireless controller is connected between a passenger control unit (PCU) and its PCU control module. For example, the PCU includes an matrix (e.g., a 2-dimensional array) of physical switches (e.g., relays, dials, sliders) via which a passenger occupying a passenger seat may adjust the seat or a variety of other peripheral devices associated with the seat, e.g., crew call buttons, fans. The actuation of a PCU switch by the passenger transmits a switch input signal to the PCU control module, which transmits the switch input signal to actuate the desired peripheral device. The wireless controller likewise incorporates a set of contacts of sufficient size to emulate the switch matrix of the PCU, the set of contacts including a contact mapped to each physical switch of the PCU switch matrix.

At a step 604, a set of encoded instructions downloadable to, and executable by, a mobile communications/computing device (e.g., personal electronic device (PED)) are provided to the mobile device, such that the mobile device may establish a wireless link to the wireless controller via Bluetooth, ZigBee, or other like wireless protocol. The encoded instructions verify the passenger as an authorized user and identify the specific PCU which the wireless controller is configured to emulate (e.g., the precise selection of seat actuators and peripheral devices controllable by the PCU). The mobile device is provided with a graphic user interface (GUI) emulating the set of contacts mapped to the physical switch matrix of the PCU by the wireless controller, such that the GUI includes a set of virtual contacts corresponding to the set of contacts within the wireless controller. When the passenger engages a virtual contact within the GUI, a contact signal is transmitted to the wireless controller via the wireless link indicative of the engaged virtual contact. In some embodiments, after the passenger has manually activated the wireless controller via the PCU, the mobile device may verify the passenger as authorized to link to the wireless controller based on verification information provided by the passenger, e.g., a unique identifier of the passenger, the flight, and/or the seat assignment; or encoded information (e.g., a passcode or QR code) provided to the passenger at check-in. In some embodiments, the wireless controller may include dip switches programmed to distinctly identify each wireless controller among other wireless controllers (e.g., within a passenger cabin or even with in a row therein), such that the passenger may identify and connect with the right wireless controller.

At a step 608, the wireless controller engages the contact within its set of contacts corresponding to the received contact signal. The PCU control module detects this engagement as a received switch input signal, e.g., as an engagement of the corresponding physical switch within the PCU (e.g., the physical switch to which the wireless controller contact is mapped) and forwards a switch input signal to the appropriate seat actuator or peripheral device as if the corresponding physical switch of the PCU had been engaged. In some embodiments, the contact signal may be received by an IFE device in communication with the wireless controller, as opposed to a wireless receiver incorporated into the wireless controller (e.g., within a common printed circuit board (PCB)), which may forward its own auxiliary signal based on the contact signal to the wireless controller via a physical (e.g., digital bus) or wireless link. The wireless controller then decodes the auxiliary signal received from the IFE device to determine the engaged virtual contact, and thus the corresponding wireless controller contact to engage such that the PCU control module forwards the appropriate switch input signal to the appropriate seat actuator or peripheral device.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A system for remote control of a passenger control unit (PCU), the system comprising:

a wireless controller physically and operatively coupled between an aircraft-based passenger control unit (PCU) and a control module of the PCU,
the PCU comprising a plurality of switches, each switch associated with at least one peripheral device,
the wireless controller comprising a plurality of contacts, at least one contact mapped to each switch of the PCU;
a wireless receiver communicatively coupled to the wireless controller, the wireless receiver configured to receive a contact signal from a mobile device associated with a user,
and
encoded instructions storable by a non-transitory storage medium of the mobile device and executable by at least one processor of the mobile device, the encoded instructions configured to cause the mobile device to:
establish a wireless link to the wireless receiver according to at least one wireless protocol;
recognize at least one of the user or the at least one peripheral device;
load a graphical user interface (GUI) corresponding to the recognized user or peripheral device, the GUI comprising a plurality of virtual contacts corresponding to the plurality of contacts;
and
when a virtual contact is engaged by the user, transmit the contact signal to the wireless controller via the wireless link, the contact signal indicative of the engaged virtual contact;
wherein based on the received contact signal, the wireless controller is configured to engage the contact corresponding to the engaged virtual contact, the engaged contact detectable by the PCU control module as an engagement of the switch to which the engaged contact is mapped.

2. The system of claim 1, wherein the wireless controller and the wireless receiver are embodied on a printed circuit board (PCB).

3. The system of claim 1, further comprising:
an in-flight entertainment (IFE) device communicatively coupled to the mobile device and to the wireless controller via at least one of a digital bus or a wireless protocol, the IFE device configured to:
receive the contact signal from the mobile device;
and
transmit an auxiliary signal based on the contact signal;
and
wherein the wireless controller is configured to:
receive the auxiliary signal;
and
identify the contact corresponding to the engaged virtual contact by decoding the received auxiliary signal.

4. The system of claim 1, wherein the peripheral device includes one or more of:
a passenger seat occupied by the user;
a call button;
a reading light;
or
a climate control device.

5. The system of claim 1, wherein the mobile device is configured to recognize the user based on verification information provided to the mobile device by the user, the verification information including at least one of:
a user identifier corresponding to at least one of the user or the mobile device;
flight information including at least one of a flight number or a seat assignment;
or
encoded information corresponding to the user.

6. The system of claim 1, wherein:
the wireless controller comprises at least one power supply operatively coupled to an aircraft power source.

7. The system of claim 6, wherein:
the wireless controller is a first wireless controller of a plurality of wireless controllers, each wireless controller corresponding to at least one of a passenger seat or a set of one or more peripheral devices;
and wherein the first wireless controller is associated with a controller identifier capable of identifying at least one of the first wireless controller, the corresponding passenger seat, or the corresponding set of peripheral devices;
wherein the encoded instructions are configured to cause the mobile device to identify each wireless controller based on its associated controller identifier.

8. A method, comprising:
connecting a wireless controller between a passenger control unit (PCU) and a PCU control module,
the PCU comprising a plurality of one or more switches, each switch associated with at least one peripheral device,
and
the wireless controller including a plurality of contacts, wherein at least one contact is mapped to each switch of the PCU;
providing a set of encoded instructions executable by at least one mobile communications device associated with a user, the encoded instructions configured to cause the mobile device to:
establish a wireless link to the wireless controller via at least one wireless protocol;
recognize at least one of the user or the at least one peripheral device;
load to the mobile device a graphical user interface (GUI) corresponding to the recognized user or peripheral device, the GUI comprising a plurality of virtual contacts corresponding to the plurality of contacts;
and
when a virtual contact is engaged by the passenger, transmit a contact signal to the wireless controller via the wireless link, the contact signal indicative of the engaged virtual contact;
and
engaging, via the wireless controller, the contact corresponding to the engaged virtual contact indicated by the contact signal, the engaged contact detectable by the PCU control module as an engagement of the PCU switch to which the engaged contact is mapped.

9. The method of claim 8, wherein providing a set of encoded instructions executable by at least one mobile communications device includes:
recognizing the user based on verification information provided to the mobile device by the user, the verification information including at least one of:
a user identifier corresponding to at least one of the user or the mobile device;
flight information including at least one of a flight number or a seat assignment;
or
encoded information corresponding to the user.

10. The method of claim 8, wherein engaging, via the wireless controller, the contact corresponding to the engaged virtual contact indicated by the contact signal, the engaged contact detectable by the PCU control module as an engagement of the PCU switch to which the engaged contact is mapped, includes:

receiving, via the wireless controller, a contact signal from the mobile device indicative of an engagement by the user with a virtual contact corresponding to an activation contact of the wireless controller, the activation contact configured for at least one of activation or deactivation of the wireless controller;
and
transitioning, via the activation contact, the wireless controller between an active and an inactive state based on the received contact signal.

11. The method of claim 8, wherein engaging, via the wireless controller, the contact corresponding to the engaged virtual contact indicated by the contact signal, the engaged contact detectable by the PCU control module as an engagement of the PCU switch to which the engaged contact is mapped, includes:

receiving the contact signal via an in-flight entertainment (IFE) device communicatively coupled to the wireless controller via one of a digital bus or at least one wireless protocol;
transmitting to the wireless controller, via the IFE device, an auxiliary signal based on the received contact signal;
receiving, via the wireless controller, the auxiliary signal;
and
identifying, via the wireless controller, the contact corresponding to the engaged virtual contact indicated by the contact signal by decoding the received auxiliary signal;
and
engaging, via the wireless controller, the identified contact.

12. The method of claim 8, wherein the peripheral device includes one or more of:
a passenger seat occupied by the user;
a call button;
a reading light;
or
a climate control device.

13. The method of claim 8, wherein the wireless controller is a first wireless controller of a plurality of wireless controllers, each wireless controller assigned to at least one of a passenger seat or a set of peripheral devices, and the encoded instructions are configured to cause the mobile device to:
identify the first wireless controller among the plurality of wireless controllers based on a controller identifier;
and
establish a wireless link to the first wireless controller via at least one wireless protocol.

* * * * *